United States Patent
Kompe et al.

(10) Patent No.: US 7,620,547 B2
(45) Date of Patent: Nov. 17, 2009

(54) SPOKEN MAN-MACHINE INTERFACE WITH SPEAKER IDENTIFICATION

(75) Inventors: Ralf Kompe, Röttenbach (DE); Thomas Kemp, Esslingen (DE)

(73) Assignee: Sony Deutschland GmbH, Cologne (DE)

( * ) Notice: Subject to any disclaimer, the term of this patent is extended or adjusted under 35 U.S.C. 154(b) by 432 days.

(21) Appl. No.: 11/042,892

(22) Filed: Jan. 24, 2005

(65) Prior Publication Data
US 2005/0187770 A1    Aug. 25, 2005

Related U.S. Application Data

(63) Continuation of application No. PCT/EP2003/08068, filed on Jul. 23, 2003.

(30) Foreign Application Priority Data
Jul. 25, 2002    (EP) .................. 02016672

(51) Int. Cl.
*G10L 15/06* (2006.01)
(52) U.S. Cl. .................. 704/245; 704/243; 704/250
(58) Field of Classification Search .......... 704/272, 704/275, 251, 231, 245, 256, 255, 270, 243, 704/233, 250, 270.1, 244
See application file for complete search history.

(56) References Cited

U.S. PATENT DOCUMENTS 5,983,178 A * 11/1999 Naito et al. .................. 704/245
6,424,946 B1 * 7/2002 Tritschler et al. ........... 704/272
6,615,170 B1 * 9/2003 Liu et al. ..................... 704/233
6,697,778 B1 * 2/2004 Kuhn et al. .................. 704/243

FOREIGN PATENT DOCUMENTS

EP    1 022 725    7/2000
WO    WO 02 31813    4/2002

OTHER PUBLICATIONS

Hazen T J: "A comparison of novel techniques for rapid speaker adaptation" Speech Communication, Elsevier Science Publishers, Amsterdam, NL, vol. 31, No. 1, May 2000, pp. 15-33, XP004199329.
Foote J T et al: "A Model Distance Measure for Talker Clustering and Identification" Proceedings of the International Conference on Acoustics, Speech, and Signal Processing (ICASSP). Speech Processing 1., vol. 1, Apr. 19-22, 1994, pp. 1-317-1-320, XP000529401.
Kosaka T et al: "Speaker-independent speech recognition based on tree-structured speaker clustering" Computer Speech and Language, Academic Press, London, GB, vol. 10, No. 1, Jan. 1996, pp. 55-74, XP004418796.
Lapidot I et al: "Unsupervised speaker recognition based on competition between self-organizing maps" IEEE Transactions on Neural Networks, Jul. 2002, IEEE, USA, vol. 13, No. 4, pp. 877-887, XP002246239.

* cited by examiner

*Primary Examiner*—Huyen X. Vo
(74) *Attorney, Agent, or Firm*—Oblon, Spivak, McClelland, Maier & Neustadt, L.L.P.

(57) ABSTRACT

The present invention provides a method for operating and/or for controlling a man-machine interface unit (MMI) for a finite user group environment. Utterances out of a group of user are repeatedly received. A process of user identification is carried out based on said received utterances. The process of user identification comprises a set of clustering so as to enable an enrolment-free performance.

23 Claims, 1 Drawing Sheet

SPOKEN MAN-MACHINE INTERFACE WITH SPEAKER IDENTIFICATION

This is a continuation of copending International Application PCT/EP2003/008068 having an international filing date of 23 Jul. 2003.

The present invention relates to a method for operating and/or for controlling a man-machine interface unit in particular for a finite member group and/or finite user group environment. More specific, the present invention relates to a method for operating and/or for controlling a man-machine interface unit which for instance enables an entertainment robot, a home network or entertainment system to learn its place.

A large variety of electronic equipment and appliances employ man-machine interface units and man-machine dialogue systems or the like to ensure an easy and reliable use of the equipment or to check the identity of a user, for example in an entrance area or the like. Therefore, in many cases the identification of a person based only on a speech input is necessary.

Current and known speaker identification methods and systems have to be trained and have to register or to explicitly enroll speakers or users who are involved in the system. To ensure particular high identification rates and a large reliability of the identification result, each speaker has to register and has to be enrolled by speaking a certain amount of text, which may be a predetermined and pre-defined text or an arbitrary, random text.

The amount of speech from each of the enrolled speakers should be as high as possible to ensure a good performance within the identification process. On the other hand, the speech to be recorded in he enrolment phase should be as short as possible to minimize the inconvenience for the user.

In particular, in the special case of a finite member group and/or finite user group, where only a finite number of different users and/or members should have access and the right for operating the equipment or the appliance, the main goal of the identification process is to classify on the given speech input if a user is known or unknown. Furthermore, in such a case, for example in a home network system or in a home entertainment system being in connection with an entertainment or service robot, the members of the distinct group of users will find it inconvenient to register or to enrol an explicit way.

It is an object of the present invention to provide a method for operating and/or for controlling a man-machine interface unit which reduces the burden of the enrolment phase for the user or the member and which at the same time also ensures a good performance.

The object is achieved by a method for operating and/or for controlling a man-machine interface unit according to claim 1. Preferred and advantageous embodiments of the inventive method or operating and/or for controlling a man-machine interface unit are within the, scope of the dependent subclaims. The object is also achieved by a home network system, home entertainment system, entertainment robot according to claim 18, a system for operating and/or for controlling a man-machine interface unit according to claim 19, and by a computer program product according to claim 20.

In the inventive method for operating and/or for controlling a man-machine interface unit, in particular for a finite member group and/or finite user group environment, utterances out of a group of users and/or members are repeatedly received. A process of member and/user identification is carried out based on said received utterances. Said process of member and/or user identification comprises a step or a subprocess of clustering to enable an enrolment-free performance.

It is therefore a basic aspect of the present invention to get rid of an explicit enrolment process provided in prior art methods within the concept of member and/or user identification, and in particular for exchanging the enrolment process by a step or subprocess of clustering within the process of member and/or user identification. Therefore, according to the present invention, it is possible to carry out improvements of member and/or user identification during the performance of the method for operating and/or for controlling a man-machine interface unit, i. e. in a real time and/or online manner.

The clustering process could work as follows. Initially, all utterances are defined as clusters (initialisation). Then, the most similar pair of utterances—using some sort of distance metric, or similarity measure between clusters—is determined. If the most similar pair is more dissimilar than a predefined threshold, the clustering process stops. Otherwise, the two clusters are merged into one. They then disappear from the set of clusters, and the new cluster is inserted. Then, again the most similar pair of clusters is determined, and the process starts over again, until the most similar cluster pair is less similar to each other than the threshold.

The resulting clusters can then be examined, and a new speaker model can be created if the largest of the resulting clusters has more then X utterances in it.

The splitting process can in principle be realized in a similar way, starting with all utterances in one speaker model. However, in this case, the clustering is continued irrespective of the similarities until two remaining clusters remain. Then, their distance is the measure which could be used to decide whether or not a speaker model should be split up.

Although any kinds of utterances may be used as utterances on which the member and/or user identification process is based, speech input is the preferred basis for said utterances.

Consequently, it is advantageous to carry out the step or subprocess of clustering with respect to said speech input and in particular with respect to respective different voices.

Further, it is advantageous to carry out said step and/or said subprocess of clustering in an unsupervised manner.

Furthermore, a process of multi-talker, multi-speaker, and/or multi-user detection is involved.

To take into account circumstances of realistic situations with respect to back-ground noise or the like, the inventive method for operating and/or for controlling a man-machine interface unit involves a process of a noise classification.

In accordance to a further preferred embodiment of the inventive method, numbers of different and/or comparable users and/or members are determined and/or updated during the performance of the method.

It is also provided as an alternative an additional measure to determine and/or to update characteristics and in particular acoustical characteristics of the voices with respect to said different and/or comparable users and/or members.

Details of the clustering process are realized by assigning voices to different voice classes and/or user classes, in particular based on features and further in particular based on differences and/or similarities of said voices.

It is preferred to take into account in the process of classifying said voices the frequency of occurrences of the voices.

Voices the frequency of occurrences of which are below a given threshold are assigned to a garbage class.

Said garbage class is used as an initial class in an initial phase of the method according to a further preferred embodiment.

To describe the reliability of membership or of the assignment of a voice to an assigned class, confidence measures are generated.

To make said confidence measures as robust as possible, the process of speaker identification, its algorithm and/or the parameters thereof are repeatedly and/or iteratively improved so as to modify speaker identification parameters.

It is of advantage to collect speech input of some different situations, in particular from far-field situations, from close-talking situations, from various background noise situations, and/or the like for improving the process of speaker identification.

According to a further aspect of the present invention, different rights of access and/or of operating are assigned as different voice classes and/or user classes. This may be of some importance with respect to home network systems, home entertainment systems, and/or entertainment or service robots or the like, where commands or orders of persons should be ignored, if they and their voices are assigned to the garbage class or to a class having no access right and no operation right with respect to the involved system.

Another idea of the present invention is to have assigned to at least one of the non-garbage voice classes and/or user classes thereto, the right to introduce a new voice class and/or user class as a non-garbage class. This may be done in particular for later acquisition, recognition, assignment and/or on explicit verbal order or verbal command.

According to a further idea of the present invention a generated speaker model and/or a generated speaker cluster is in each case stored together with the input speech associated therewith or with sequences thereof.

Further, utterances or speech input received from known speakers are added to improve a speaker model and/or a speaker cluster for said known speaker and/or its performance.

According to a further preferred embodiment of the inventive method upon addition of at least one further utterance or speech input of a known speaker it is checked on whether or not the associated speaker model and/or speaker cluster can be split up into distinct sub-models and/or sub-clusters, respectively.

In this attempt for splitting up the models or clusters acoustical features as well as speaker or user profile differences which are generated based on tentatively generated sub-models and/or sub-clusters are used to obtain differences between said tentatively generated sub-models and/or sub-clusters.

Preferably, the splitting process is carried out if a distance between said sub-clusters and/or sub-models exceeds a predefined threshold, in which case the distinct sub-models and/or said sub-clusters are generated and used for discriminating and describing distinct speakers.

It is further preferred to use as said distance a combination of the acoustic distance and of the differences in the user profiles.

According to another aspect of the present invention, a home network system, a home entertainment system, an entertainment or service robot or the like are provided which are capable of performing and/or realizing the inventive method for operating and/or controlling a man-machine interface unit.

It is a further aspect of the present invention to provide a system, an apparatus, a device, and/or the like for operating and/or for controlling a man-machine interface unit which is in each case capable of performing and/or of realizing the inventive method for operating and/or for controlling a man-machine interface unit and/or of its steps.

Additionally, it is a further aspect of the present invention to provide a computer program product comprising computer program means which is adapted to perform and/or to realize the inventive method for operating and/or for controlling a man-machine interface unit according to the present invention of the steps thereof, when it is executed on a computer, a digital signal processing means, and/or the like.

These and further aspects of the present invention will become now elucidated taking into account the following remarks:

An automatic clustering method for speaker identification is proposed. With this a home entertainment system, e. g. a robot or the like, can get to know automatically the members of a user group, e. g. of a family. No dedicated or explicit enrolment of each group member or family member is necessary.

The methods and technologies used by the invention in particular are
 speaker identification,
 unsupervised clustering,
 multi-talker or multi-speaker detectors, e. g. based on microphone arrays or independent component analysis,
 noise classification is possible by the same methods as known for speech recognition or by any other pattern classification model.

Speaker identification for home entertainment systems is successfully implemented and may be used in e. g. humanoid robot products.

Speech recognition and general classification as well as unsupervised clustering methods are developed.

Current systems using speaker identification need an enrolment phase, where the speaker has to read a text, which may be a predetermined and predefined text or an arbitrary, random text.

A possible embodiment of the invention is for instance a man-machine interface (MMI) module or device for a home entertainment system consisting of at least an entertainment robot, a A/V device, or a home server, or a home network connecting two or more of these devices. The MMI needs to be able to make suggestions to the user e. g. for the purpose of music contents selection or TV program selection. For this a user profile or user model is necessary. In the case of speech input, the MMI needs to interpret certain ambiguous utterances such as "my favourite music" based on a user profile. Such a MMI will often be used by several people, e. g., the members of a family. Therefore automatic speaker identification will be used by the MMI to select the appropriate user profile. In the case of robots, they should react differently to different people. A simple case would be that they ignore the commands of non-owners or non-family members, or that the dialog-style would be more formal with unknown persons. Also in this case speaker-identification is necessary.

The use of speaker-identification in a home environment is a special case, because there are only few people using the same system (in contrast for example to an automatic teller machine). The system (MMI) needs to distinguish among the members of a household and also detect any non-member. However, users of such a system (especially in the case of a robot) probably would not like to undergo an enrolment session where the speaker has to read specific sentences such that the system learns the acoustic characteristics of that speaker.

The invention proposes that the system from the first usage on automatically clusters the speech of the different voices. It thereby should identify automatically the number of family members and, the acoustic characteristics of their voices. Non-frequent voices should automatically be put in a "garbage" class. The system will use a measure of confidence indicating how sure it is about class membership of certain voices. It will automatically iteratively improve the speaker identification parameters until enough confidence is obtained. In this procedure it will try to collect speech from different situations (e. g., far-field vs. close-talking microphone, various background noises) in order to achieve robustness.

Group or family members can introduce new persons to the system. It then automatically acquires the acoustic characteristics of this person's voice and can recognize it later. Family members can then also define the rights of this "new" person, e. g., to what extent (s) he is allowed to control the devices/robot.

In order that the unsupervised clustering will succeed, the system is able to detect situations where more than one speaker is speaking and it can classify different environmental or noise conditions.

Automatic clustering can be performed e.g. by the following algorithm:
1. initial class is garbage class
2. obtain a feature set from new speech signal
3. apply speaker identification
4. apply confidence measurement (in the simple case this is just the score of the statistical classifier applied in (3)
5. if (classification result is garbage class) perform clustering, i.e. go to (7).
6. go to (2)
7. store feature set in garbage memory; keep only the n most recent feature sets in memory
8. perform cluster algorithm (e.g. vector quantization, neural gas, . . . ): a cluster contains similar feature sets; in contrast to standard clustering, the number of clusters is not predefined, but a cluster should only contain similar feature sets
9. if a cluster contains more than m feature set, compute speaker model out of these, store the speaker model, and use it from now on in step (3); remove the corresponding feature sets
10. go to (6)

Current systems using speaker identification need an enrolment phase, where the speaker has to read a text, which may be a predetermined and predefined text or an arbitrary, random text. This enrolment is avoided with the current invention. With this usability and also entertainment value is increased.

These and further aspects and advantages of the invention will be discussed in more detail taking reference to the accompanying figure.

Figure 1:
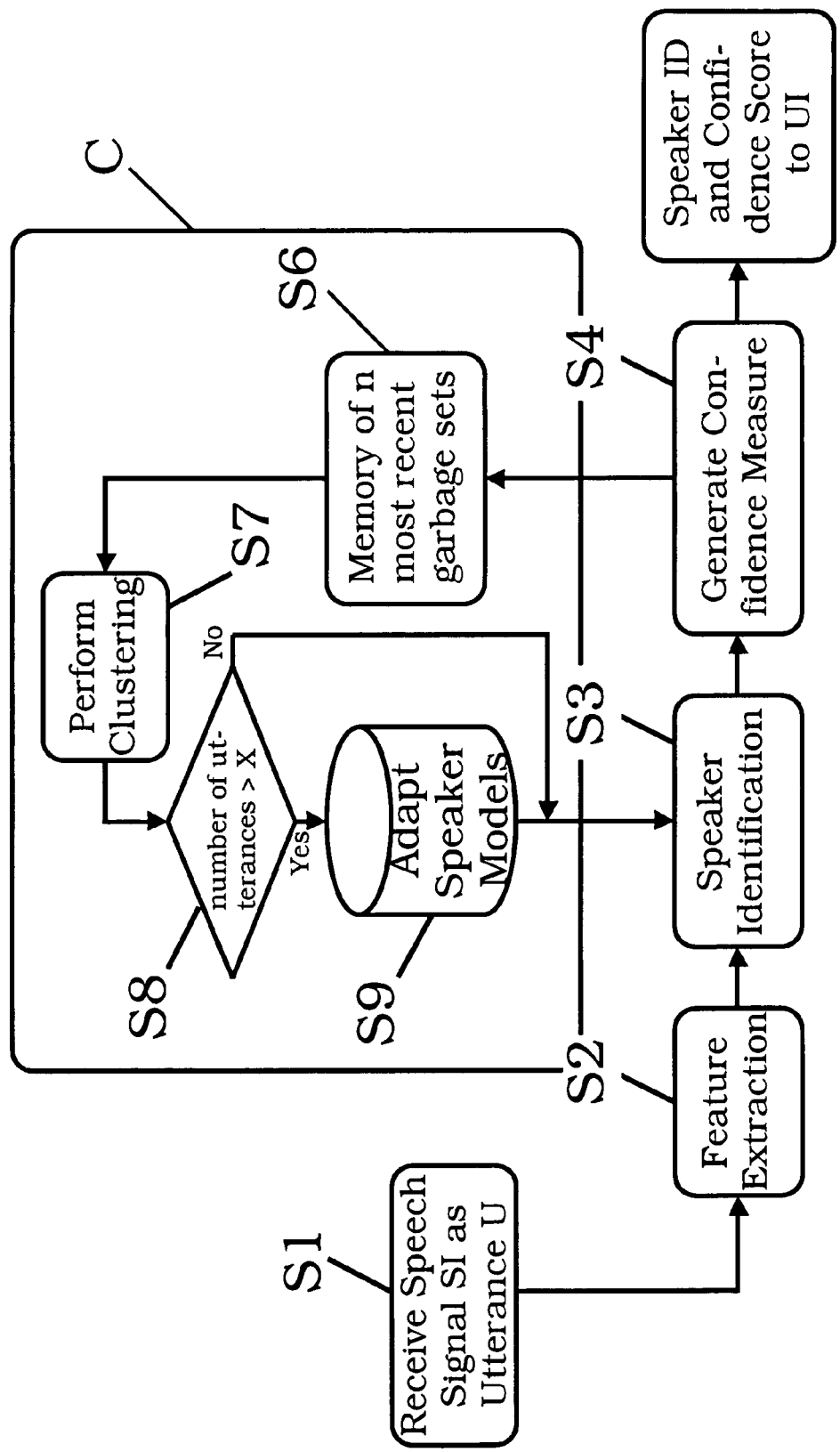
FIG. 1 is a schematical block diagram describing a preferred embodiment of the inventive method for operating and/or for controlling a man-machine interface unit The block diagram of FIG. 1 demonstrates the performance of the inventive method for operating and/or for controlling a man-machine interface unit with respect to a single received speech signal or speech input SI as an utterance U to be analyzed.

In step S1 of the embodiment of FIG. 1, the speech signal SI is received as an utterance U. From the received utterance U respective features are extracted in step S2.

Based on the extracted features, a process of speaker identification is performed in step S3, and afterwards a confidence measure is determined in step S4 to measure the reliability of the speaker identification of step S3.

In step S5, from the result of the speaker identification of step S3 and the confidence measure of step S4, the speaker identification result is output taking reference for instance to a speaker identification number, to a confidence score, to a user profile, or the like.

To enable the, performance of steps S1 to S5 for speaker identification without having an enrolment phase for different speakers, it is a basic aspect of the present invention to include a so-called clustering loop. C comprising steps S6 to S9, wherein the information obtained from the feature extraction S2 and the confidence measurement S4 in connection with the received speech signals are classified into speaker models in step S9. It is therefore necessary to branch, from step S4 of determining the confidence measure to step S6 of storing the last n garbage feature sets obtained in former step S2 of feature extraction, if the extracted feature set in each case indicates the membership to a garbage class, if at the same time the confidence measure for belonging to a garbage class is strong.

In step S7, a clustering is performed upon which the classes for the speakers and the modules or models therefore can be modified by adding new speaker characteristics or modified speaker characteristics. This can be done in step S9 on the condition of step S8 that anyone of the clusters of step S7 has a number of utterances larger than a given threshold number X.

If the confidence score or measure is not needed by the further processing of step S5, step S4 can be included into loop C. This will save processing time in the case of known speakers.

In the embodiment of FIG. 1, the speaker models of step S9 will not be changed after they are initially created in step S7. Since the process is unsupervised, any given speaker model might erroneously comprise speech from more than one speakers. If such an error occurs, it cannot be remedied in this embodiment. In the case of a user profile application, where a user profile is generated for every speaker, this user profile information can be used in the following way.

Firstly, it is proposed to store not only the final speaker model, but also the speech associated with it, when storing a model in step S9. Every time a new utterance of a known speaker is added, it will be used to improve the performance of the stored model of this speaker.

When a new utterance of a known speaker is added, there will be a splitting attempt, where the cluster belonging to the speaker is split into two distinct subclusters. In the splitting step, not only the acoustical features are used to find differences between the two tentative subclusters, but also the difference between the user profiles which are computed based on the tentative subclusters.

A split is assumed if said distance as a combination of acoustic distance and differences in user profiles exceeds a predefined threshold. In this case, two distinct speaker models are generated and two different user profiles are associated with them:

In this way, two advantageous behaviours can be achieved:

First, acoustical similar speakers which have very different user profiles ten be separated. This is particularly important since inside a family, the voices of say father and son can be very similar, but the user profiles are usually very different.

Second, if any given user shows a mood-dependent behaviour, e. g. favouring classical music if he is tired; an selecting pop music if he is happy, there will be two speaker models be created for him if he is using the system frequently.

Since it can be assumed that the voice is different depending on the mood; by the appropriate selection of the mood-dependent speaker model, automatically the mood-dependent user profile is selected.

The invention claimed is:

1. A method for operating a man-machine interface unit included in at least one of a home network system, a home entertainment system, and a service robot, the method comprising:
   receiving an utterance of a person;
   identifying the person on the basis of a previously computed speaker model as one of an unknown person and a known member of a predetermined group restricted to a predetermined, finite first number of members that have not undergone an enrollment process by speaking an enrollment text;
   determining, on the basis of a confidence measure measuring reliability of the identification, whether a clustering process is to be performed;
   including, if the clustering process is to be performed, the received utterance into a garbage class including at most a predetermined second number of most recently received utterances, and clustering the garbage class in an unsupervised manner with each of the included utterances forming an initial cluster by repeatedly merging most similar clusters until the remaining most similar clusters are more dissimilar than a predetermined threshold;
   computing a further speaker model from one of the clusters if the one of the clusters includes more than a predetermined third number of utterances, thereby deleting utterances of the one of the clusters from the garbage class;
   storing the further speaker model for identifying another person when receiving an utterance of the another person;
   associating a first submodel with a first user profile and a second submodel with a second user profile, the first and second user profiles including a user preference;
   determining a distance between the first submodel and the second submodel based on an acoustic distance and differences between the first user profile and the second user profile;
   splitting the speaker model into the first and the second submodel if the determined distance between the first and second submodel exceeds a predefined threshold; and
   operating the at least one of the home network system, the home entertainment system, and the service robot.

2. The method according to claim 1,
   wherein the utterances include speech input.

3. The method according to claim 2,
   wherein said clustering is carried out with respect to the speech input and with respect to respective different voices.

4. The method according to claim 2, further comprising:
   storing the speaker model together with the speech input associated therewith.

5. The method according to claim 1,
   wherein the identifying includes a process of multi-talker, multi-speaker, or multi-user detection.

6. The method according to claim 1, further comprising:
   classifying a noise.

7. The method according to claim 1,
   wherein the identifying includes identifying or updating the first number of members.

8. The method according to claim 7, further comprising:
   determining characteristics of said different members and acoustic characteristics of voices of said different members.

9. The method according to claim 8, further comprising:
   classifying voices of said different members to different voice classes based on features of said voices and based on differences or similarities of said voices.

10. The method according to claim 9,
    wherein the classifying the voices is based on a frequency of occurrence of the voices.

11. The method according to claim 10, further comprising:
    assigning voices having a frequency of occurrence below a given threshold to the garbage class.

12. The method according to claim 11, further comprising:
    an initial phase of operation; and
    using said garbage class as an initial class in the initial phase of operation.

13. The method according to claim 9, further comprising:
    generating confidence measures describing the reliability of the assignment of a voice to an assigned voice class.

14. The method according to claim 13, further comprising:
    repeatedly or interactively improving an algorithm or a parameter in the identifying to modify speaker identification parameters until said confidence measures are robust.

15. The method according to claim 14,
    wherein the improving the algorithm or the parameter in the identifying further comprises collecting speech input of different situations including far-field talking situations, close-talking situations, or various background noise situations.

16. The method according to claim 9, further comprising:
    assigning different rights to said different voice classes.

17. The method according to claim 16,
    wherein the assigning different rights further comprises assigning a right to a non-garbage voice class to introduce a new voice class as a new non-garbage class, and the right pertains to a later acquisition, recognition, assignment, or an explicit verbal order.

18. The method according to claim 1, further comprising:
    adding the further member utterance to improve a speaker model for said identified member.

19. The method according to claim 1, further comprising:
    receiving a further speech input from the identified member; and
    determining if a speaker cluster can be split up into distinct subclusters based on the further speech input.

20. The method according to claim 1, further comprising:
    determining an acoustic characteristic or a profile of the member based on a distinct submodel; and
    obtaining differences between said distinct submodels based on the determined acoustic characteristic or the profile of the member.

21. A method for operating or controlling an entertainment robot, or a home network, for a group including a finite number of members, the method comprising:
    operating a man-machine interface unit included in the entertainment robot or the home network, the operating comprising
    receiving an utterance of a person;
    identifying the person on the basis of a previously computed speaker model as one of an unknown person or a known member of a predetermined group restricted to a predetermined, finite first number of members that have not undergone an enrollment process by speaking an enrollment text;

determining, on the basis of a confidence measure measuring reliability of the identification, whether a clustering process is to be performed;

including, if the clustering process is to be performed, the received utterance into a garbage class including at most a predetermined second number of most recently received utterances, and clustering the garbage class in an unsupervised manner with each of the included utterances forming an initial cluster by repeatedly merging most similar clusters until the remaining most similar clusters are more dissimilar than a predetermined threshold;

computing a further speaker model from one of the clusters if the one of the clusters includes more than a predetermined third number of utterances, thereby deleting utterances of the one of the clusters from the garbage class;

storing the further speaker model for identifying another person when receiving an utterance of the another person;

associating a first submodel with a first user profile and a second submodel with a second user profile, the first and second user profiles including a user preference;

determining a distance between the first submodel and the second submodel based on an acoustic distance and differences between the first user profile and the second user profile; and splitting the speaker model into the first and the second submodel if the determined distance between the first and second submodel exceeds a predefined threshold.

22. A system for operating a man-machine interface unit, the system comprising:

a receiver configured to receive an utterance of a person;

an identifying unit configured to identify the person on the basis of a previously computed speaker model as one of an unknown person and a known member of a predetermined group restricted to a predetermined, finite first number of members that have not undergone an enrollment process by speaking an enrollment text;

a determining unit configured to
  determine, on the basis of a confidence measure measuring reliability of the identification, whether a clustering process is to be performed,
  include, if the clustering process is to be performed, the received utterance into a garbage class including at most a predetermined second number of most recently received utterances, and to cluster the garbage class in an unsupervised manner with each of the included utterances forming an initial cluster by repeatedly merging most similar clusters until the remaining most similar clusters are more dissimilar than a predetermined threshold, and
  compute a further speaker model from one of the clusters if the one of the clusters includes more than a predetermined third number of utterances, thereby deleting utterances of the one of the clusters from the garbage class,
  associate a first submodel with a first user profile and a second submodel with a second user profile, the first and second user profiles including a user preference,
  determine a distance between the first submodel and the second submodel based on an acoustic distance and differences between the first user profile and the second user profile, and
  split the speaker model into the first and the second submodel if the determined distance between the first and second submodel exceeds a predefined threshold; and a memory configured to store the further speaker model for identifying another person when receiving an utterance of the another person.

23. A computer memory, comprising a computer program, which when executed by a computer, performs a method for operating a man-machine interface unit, comprising:

receiving an utterance of a person;

identifying the person on the basis of a previously computed speaker model as one of an unknown person or a known member of a predetermined group restricted to a predetermined, finite first number of members that have not undergone an enrollment process by speaking an enrollment text;

determining, on the basis of a confidence measure measuring reliability of the identification, whether a clustering process is to be performed;

including, if the clustering process is to be performed, the received utterance into a garbage class including at most a predetermined second number of most recently received utterances, and clustering the garbage class in an unsupervised manner with each of the included utterances forming an initial cluster by repeatedly merging most similar clusters until the remaining most similar clusters are more dissimilar than a predetermined threshold;

computing a further speaker model from one of the clusters if the one of the clusters includes more than a predetermined third number of utterances, thereby deleting utterances of the one of the clusters from the garbage class;

storing the further speaker model for identifying another person when receiving an utterance of the another person;

associating a first submodel with a first user profile and a second submodel with a second user profile, the first and second user profiles including a user preference;

determining a distance between the first submodel and the second submodel based on an acoustic distance and differences between the first user profile and the second user profile; and splitting the speaker model into the first and the second submodel if the determined distance between the first and second submodel exceeds a predefined threshold.

* * * * *